Nov. 15, 1966 P. BAUER 3,286,086
PURE FLUID BINARY ADDER
Filed Dec. 3, 1964 2 Sheets-Sheet 1

INVENTOR
PETER BAUER
BY Hurvitz & Rose
ATTORNEYS

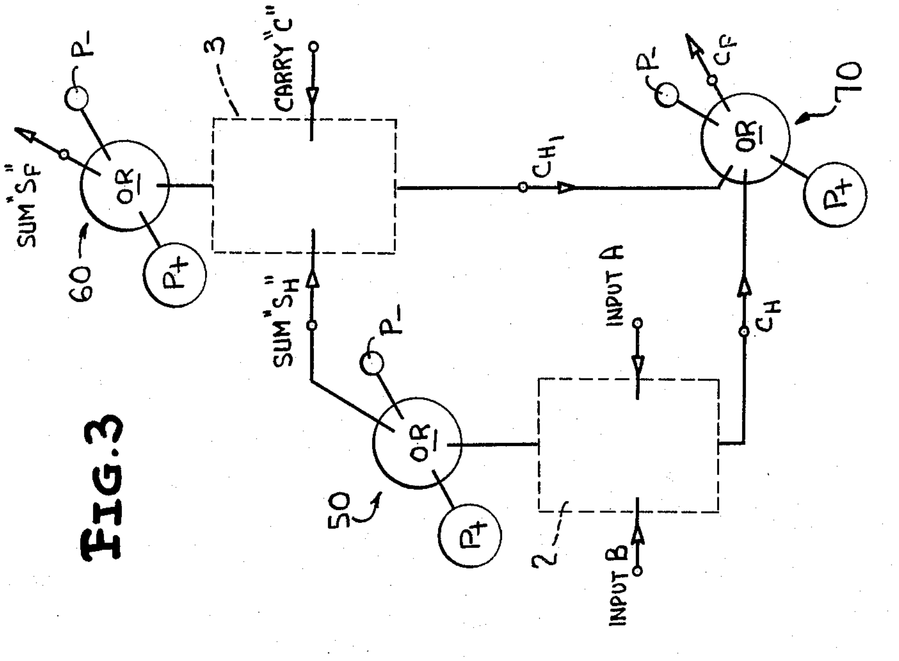
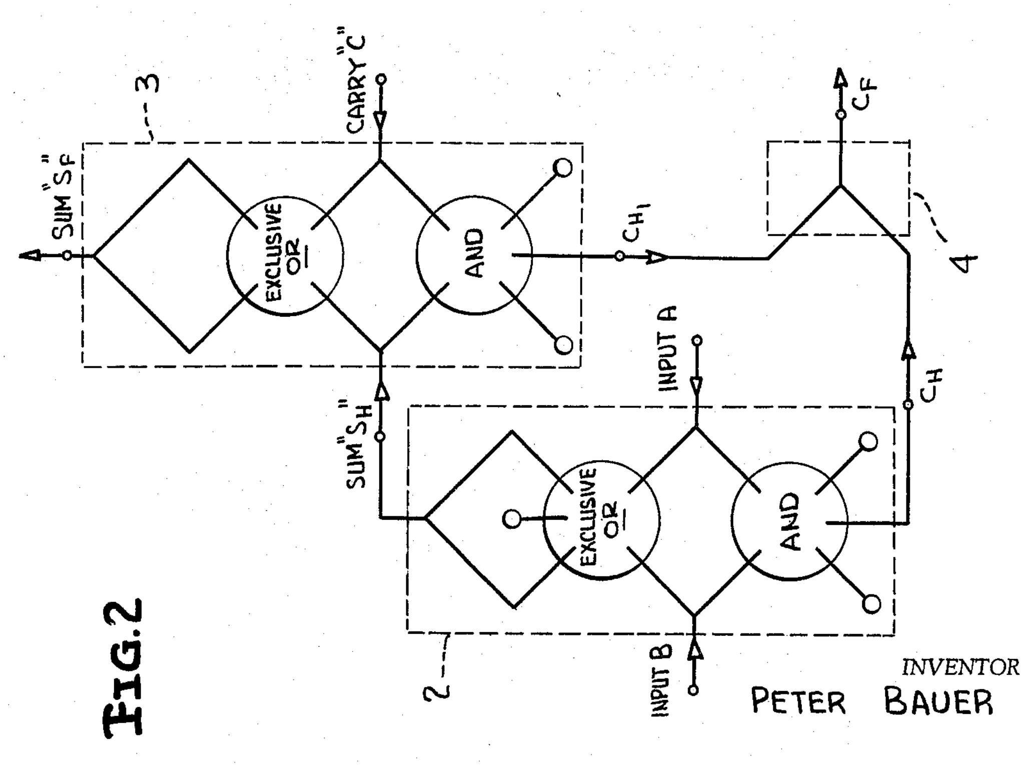
INVENTOR
PETER BAUER
BY Hurvitz & Rose
ATTORNEYS 3,286,086

PURE FLUID BINARY ADDER

Peter Bauer, Germantown, Md., assignor to Bowles Engineering Corporation, Silver Spring, Md., a corporation of Maryland Filed Dec. 3, 1964, Ser. No. 415,735
5 Claims. (Cl. 235—201)

The present invention relates to pure fluid systems or circuits and, more particularly, to a fluid system or circuit for performing binary addition functions.

Electronic and fluid logic elements for performing the basic arithmetic functions are well known in the computer art. It is also well known to carry out more complicated computer functions with networks or circuits made up of the basic logic elements. When the elements are thus properly combined, these circuits perform the desired logic functions with speed, accuracy and reliability.

Generally speaking, in comparing electronic systems to fluid systems, the former can perform most computer functions with considerably greater speed due to the inherent nature of the two systems. However, fluid systems have been proven by actual tests to rival electronic systems in terms of accuracy and reliability in performing various computer functions. Since, as is well known in the art, it is more desirable in some cases to use fluid systems rather than electronic systems, a great need has existed for fluid computing systems that exhibit high levels of accuracy and reliability while performing their function in the least amount of time.

In the electronic and fluid digital computing arts in general, functions are usually performed in the binary system of notation wherein only two quantities or values are used. These two values are designated 1 and 0, depending upon whether or not a signal is present or absent in a signal channel. Generally in fluid systems, and for purposes of this disclosure, the binary 1 represents the energized form of the signal, i.e. the presence of fluid flow in a first channel and absence of fluid flow in a second channel, and the 0 value represents the unenergized form of the signal or the absence of fluid flow in the first channel and presence in the second channel. It is to be understood that this invention contemplates also the use of other counting systems, but is described relative to the binary system for ease of description.

With the foregoing background in mind, the present invention is concerned with an improved fluid system and an improved fluid element for performing the binary addition and the binary half addition functions, respectively, which are well known and widely used functions in computers today. Briefly, in binary addition, a series of combinations of binary 1 and 0 signals are fed to the system and added in the conventional way, the system generating an appropriate carry signal which is to be employed in the succeeding addition operation. In a binary half-adder, addition is performed in the same manner with the use of binary 1 and 0 signals, but a carry signal from a previous operation is not accepted, thus providing only a half of an addition as is generally well known in the art.

One method of performing binary addition in the electronic art is to employ two half adders and an OR gate in the carry channel. It is generally held, however, that an electronic full adder derived in this way is not the best possible arrangement for at least one reason, which is that the total number of power tubes and thus the power consumption is greater than that required in other systems with larger number of elements which elements, however, consume little power.

It was discovered recently in the fluid art that the half adder function could be performed in an advantageous manner with the use of a single pure fluid element instead of a large number of fluid elements derived from their electronic counterparts. The element was unique in that it required no power source as in the previous electronic and fluid systems, but required only the introduction of the two signals to be added to carry out its function. Thus, this single fluid element has become known in the fluid computer art as the Ezekiel and Greenwood "passive half adder".

It has been found that in the Ezekiel passive half adder, certain difficulties have arisen when it has been attempted to combine it with other elements to perform more complicated functions, such as the full addition function. More particularly, when two passive half adders plus an OR element are combined as a binary adder, false and spurious sum output signals are generated.

Because of these difficulties, it has been proposed to use other various combinations of proven pure fluid elements to perform the addition function, such as AND-NOT, OR and OR-NOR components disclosed in the patent to Warren et al., No. 3,107,850, October 22, 1963. Although this type of circuit performs well, it requires a large number of power devices which increases the power consumption of the system, a result that it is generally wished to avoid.

In view of the above, it is desired, if possible, to employ passive half adders if their deficiencies can be overcome since the power consumption is low. I have determined that the malfunction in the prior art half adder of the Ezekiel type, when employed in a full adder, results from the fact that all of the receiving ducts of the half adder must be utilized in a full adder to generate either a sum (binary 1) or a carry signal on the one hand and the binary 0 on the other hand which leaves no outlet to relieve the system of excess fluid that results from at least two conditions that arise from time to time during operation of the device. The first condition arises due to increase in pulse rate due to a change in the input signal frequency. The second condition results from a succession of 0 output signals at the sum output, or in other words, when fluid signals are applied, over an extended period alternately to both input channels. Although the specific sources of these two troubles are different, the net result is the same. Specifically, fluid is introduced into the system at such a rate that the output passage to which flow is directed cannot handle the total flow. Actually, the passages are of sufficient size to handle the flow but where all passages are employed to feed further elements of the system, the backloading due to the input channels of these further elements on the passages prevents the rapid transfer of fluid from the output passages to the subsequent elements. This results in a build-up in fluid in the passages and consequently in swamping of the interaction region with fluid so that the receiving ducts are rendered incapable of discriminating between signals and overflow. Either of these conditions then causes generation of spurious and false signals in the system. These false signals in turn are mistaken for proper signals by the other elements of the system whereby the system is rendered inaccurate.

According to the present invention, a new and improved binary addition circuit of the pure fluid type is provided wherein a novel half-adder is utilized. In my half adder, I have separated the addition and carry functions by providing two half adders of the prior art type, one employed as an exclusive OR component for generation of the sum outputs and the other employed as an AND component for generation of the carry outputs. The output ducts provided in the prior art half adders which are not employed as signal channels in the present system are utilized in each of the components to provide fluid dumps for the unwanted fluid. The fluid dumps communicate with atmosphere or a sump, as desired. With the release of the excess fluid in such a manner, the circuit has been found to perform the binary addition function free from the previous difficulties.

My pure fluid circuit, in addition to having no moving parts, is simple and easily and inexpensively fabricated. It requires no "active" fluid elements that consume power and has a minimum response time because of its simplicity and lack of power elements. Further, the device has been tested and found to perform as discussed.

Broadly, an object of this invention is to provide an improved pure fluid circuit to perform the binary half and full adder functions.

Another object of this invention is to provide an improved binary half adder and/or binary full adder of the pure fluid type.

Still another object of this invention is to provide an improved fluid circuit of two passive half adders and an OR element to perform the binary full adder function.

It is another object of this invention to provide a pure fluid half adder that can be utilized in pure fluid circuits and the like.

It is still another object of this invention to provide a pure fluid half adder wherein the addition and carry components are separate.

The above and still further objects, features and advantages of the present invention will become apparent upon consideration of the following detailed description of one specific embodiment thereof, especially when taken in conjunction with the accompanying drawings, wherein:

FIGURE 2 is a diagrammatic illustration representing the system of FIGURE 1;

FIGURE 3 is a diagrammatic illustration of a possible modification of the system of FIGURE 1, wherein power elements are provided to boost the signal streams.

Figure 1:
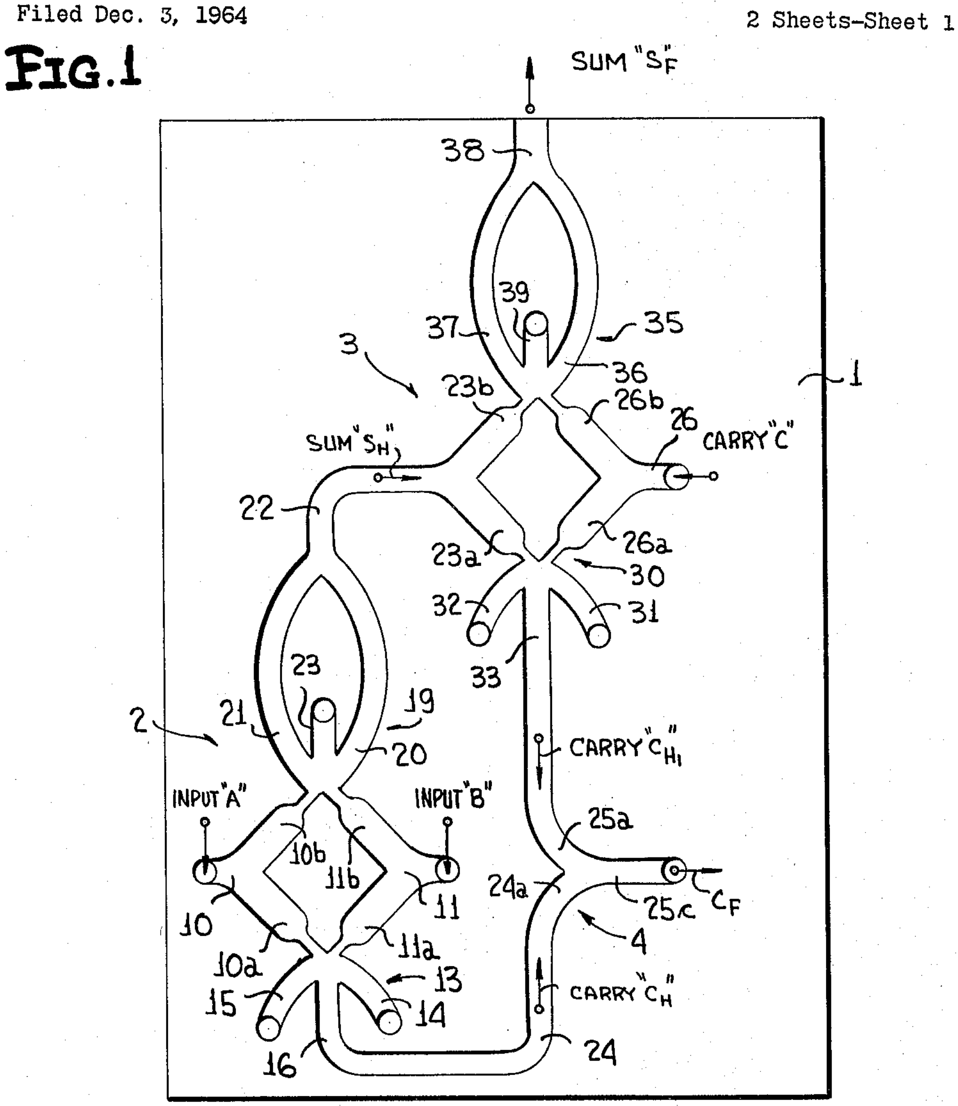
FIGURE 1 is a schematic illustration of the entire fluid system for performing binary addition in accordance with the present invention.

Referring now to FIGURE 1 of the accompanying drawings, reference numeral 1 generally designates the body of the device which contains an interconnected system of fluid elements with associated ducts and passages in the manner shown. This system of ducts and passages performs a binary addition function and broadly, consists of only three pure fluid elements; a first half adder element 2, a second half adder element 3 and an OR element 4. In the preferred embodiment shown, all three of these elements are of the passive type; i.e. they do not require a power source for the proper performance of their function.

Fluid is introduced into the system at three inputs, represented generally by arrows A, B, and C from any appropriate source of binary pulses, not particularly shown in any of the figures. Thus, fluid enters the system only when a binary 1 signal is present at either A or B or C, or any combination of these. An intermediate sum output, represented generally by arrow $S_H$, is generated in the system by certain binary input signal combinations. Carry outputs and a final sum output, represented by the arrows C, $C_H$ and S, respectively, are generated in the system by certain other binary input signal combination and/or successive input signal combinations. The generation of these output signals and the operation of the device will become clearer upon consideration of the following detailed description of each of the elements of the system and the overall system's operation.

In FIGURE 1, first two inputs A, B are applied to input passages 10 and 11, respectively, of the first half adder element 2, which element forms an important part of the present invention and will now be discussed in detail. Each of the passages 10, 11 branch into two separate nozzles **10*a*, 10*b*, and 11*a*, 11*b***, respectively, which are adapted to receive fluid flow from the inputs A, B, respectively, and to issue associated fluid streams into two separate components in such a manner as to perform the desired half adder function in two separate and distinct operations.

More particularly, the nozzles **10*a* and 11*a* form input means for a first component, generally designated by reference numeral 13. This component is generally known in the art as the passive AND and is utilized here in accordance with the present invention to supply a carry output $C_H$. The passive AND component 13 is made up to two outside receiving ducts or dumps 14, 15, which merely release any unwanted fluid to the atmosphere or to a sump, as desired, and a center or output duct 16, which is adapted to provide either the binary 1 or 0 output signal in accordance with the binary signals from the inputs A, B. In operation, a binary 1 output signal is generated in the output duct 16 only when inputs A and B both have binary 1 signals applied thereto, the fluid flow from either input A or B alone being passively received by dumps 14 or 15, which are directed towards the nozzles 10*a* and 11*a*, respectively, for this purpose. Or, in terms of Boolean algebra, the carry function of the AND component 13** can be expressed as follows:

$$A \cdot B = C_H$$

wherein A and B are input signals or binary 1's and $C_H$ is the carry output.

The remaining two nozzles **10*b* and 11*b* form input means for a second component, generally designated by reference numeral 19 and known in the art as a passive exclusive OR circuit. The passive exclusive OR component 19, which provides the intermediate sum output $S_H$ to the half adder element 3 of the system, has two output receiving ducts 20, 21, which merge into a common output duct or passage 22, and a single center dump 23. In operation, a binary 1 output signal is generated in the duct 22 only when either input A or B alone presents a binary 1 signal, since when both A and B have binary 1 signals, each fluid stream excludes the other from one of the output receiving ducts 20 or 21, and the fluid flow is directed to the center dump 23. The ducts 20 and 21 are directed toward the nozzles 10*b* and 11*b*, respectively, so that they passively receive the fluid flow when, and only when, only one binary 1 input signal is received at inputs A or B. In terms of Boolean algebra then, the sum function of the exclusive OR component 19** can be expressed as follows:

$$A\overline{B} + \overline{A}B = S_H$$

wherein A and B are inputs and $S_H$ is the sum output.

The multi-component half adder 2 described above is a very important subcombination of my device, as previously suggested. Basically, the separation of the fluid half adder 2 into the independent exclusive OR component 19 to produce the sum output and an AND component 13 to produce the carry output, allows the half adder function to be performed with fluids in circuits or systems without the difficulties caused by excess fluid. The center dump 23 of the exclusive OR component 19 and the outer dumps 14 and 15 of the AND component 13 are not backloaded by the system and have been found to successfully relieve the interaction regions of the respective components of excess fluid and thus render them immune to generation of spurious operation as a result of pulse rate increase and continuous operation in one mode. This results from the fact that any unwanted fluid is released unimpeded to atmosphere or a sump via the unloaded dumps. A further advantage of the separation of the two functions (exclusive OR and AND) is the possibility of using slightly differing silhouette configurations for the two separate components of the half adders. This allows the designer to achieve improved signal pressure recovery in the respectively utilized output receiving ducts in each component by designing the interaction region of that component in favor of receiving maximum fluid flow in the output ducts since any consequent signal loss in the alternate receiving ducts, which in this "separated function" case are used merely as dumps, does not matter.

Other important advantages of my half adder can be visualized by referring again to FIGURE 1. As illustrated, the element is not only generally simple and efficient in design, but provides a particular advantage in that only one level of structural plate is required in fabrication. That is, since the output ducts 20, 21 which receive the sum output are physically separated from the output duct 16 which receives the carry output signal, neither of the outputs has to be transferred to another level of structural plate for crossover and back again for utilization. The latter form is necessary when using the Ezekiel passive half adder element in a circuit or system since, as previously pointed out, the center duct in that element must be used to supply the output for the carry function. This particular feature of my device not only conserves response time, but also by-passes the sealing problems encountered in multilevel designs and is thus advantageous in laying out the fluid circuit or system.

Referring again to FIGURE 1 for a description of the remainder of my binary adder circuit, the output duct 16 connects with passageway 24 to supply the OR element 4 with the carry output $C_H$ from the half adder element 2. Input duct **24*a* of the OR element 4 is formed by the terminal portion of the passageway 24 and a similar passageway 25 terminates in a second input duct 25*a*. The passageway and duct 25, 25*a* transmit the carry output $C_{H_1}$ generated by the second half adder 3, which will be discussed later. Output channel 25*c* of the OR element 4 is formed by the merger of the passageways 24 and 25 so that it passively receives either of the carry outputs $C_H$ or $C_{H_1}$ and transmits a full adder carry output, generally represented by the symbol $C_F$. The OR element 4 may alternatively be an exclusive OR element, as used in the rest of the circuitry since carry outputs $C_H$ and $C_{H_1}$ never have binary 1 signals simultaneously. In this case, the binary 1 signals of the half adder carry outputs $C_H$ and $C_{H_1}$ are received by the outside receiving ducts of the exclusive OR element, which merge downstream into a single duct to transmit the full adder carry output $C_F$. An advantage of this arrangement is that excess fluid can be disposed of via the center duct, as discussed in regard to the exclusive OR element 2**.

As previously indicated, the second half adder element 3 is connected to receive the output signal $S_H$ of the element 19. The half adder 3 further receives the third input C at input passage 26, which may or may not be the full adder carry output $C_F$ of the system. If carry output $C_F$ is utilized as the third input C, the binary 1 signal is propagated through a 1 bit delay by a suitable length of channel (not shown) so that it is coordinated with the other signals in the system.

As illustrated, the second half adder 3 is constructed in the same multi-component form as the first half adder 2. Briefly, passage 22 from the half adder element 2 branches into separate nozzles **23*a*, 23*b* and passageway 26 branches into separate nozzles 26*a* and 26*b* at the half adder 3. Nozzles 23*a* and 26*a* exit into a passive AND component 30, which has dumps 31, 32 and output duct 33. The duct 33 empties into passageway 25, which feeds the carry output $C_{H_1}$ via the OR element 4, as previously indicated. The nozzles 23*b* and 26*b* exit into a passive exclusive OR element 35 with output receiving ducts 36, 37 that merge into output passage 38, and a single center dump 39. The binary signal present in the output passage 38** represents the binary sum output of the system as indicated in FIGURE 1.

As in the case of the first half adder 2, the separation of the half adder element 3 into two separate components 30 and 35 produces very real advantages in terms of operation of my binary addition system. As before, the excess fluid is disposed of via the dumps in each of the components whereby backloading or any increase in frequency of input signals does not swamp the interaction region of the device causing spurious and false signals which would render the system inoperative. Also, different silhouettes can be used to achieve the better signal recovery in the two separate components, and no physical cross over of outputs is necessary since the sum and carry output ducts 38, 33 are separated.

FIGURE 2 of the drawings is a simplified block diagram of the device of FIGURE 1, the latter being interpreted as being comprised of the above-identified logical elements and components. For example, the half adders 2 and 3 and the OR element 4 are outlined by rectangles of dashed lines. The circular blocks represent the AND and exclusive OR components and the input and output signals are represented by arrows as in FIGURE 1. FIGURE 2 can therefore be interpreted as a shorthand representation of the device of FIGURE 1 and can be utilized to understand, in terms of Boolean algebra, the full binary addition operation of the system of the present invention, as follows:

Sum $$S_F=S_H\cdot\overline{C}+\overline{S}_H\cdot C$$

$$S_F=(A\cdot\overline{B}+\overline{A}\cdot B)\overline{C}+\overline{(A\cdot\overline{B}+\overline{A}\cdot B)}C$$

$$S_F=A\cdot\overline{B}\cdot\overline{C}+\overline{A}\cdot B\cdot\overline{C}+(\overline{A\cdot\overline{B}}\cdot\overline{\overline{A}\cdot B})C$$

$$S_F=A\cdot\overline{B}\cdot\overline{C}+\overline{A}\cdot B\cdot\overline{C}+(\overline{A}+B)(A+\overline{B})C$$

$$S_F=A\cdot\overline{B}\cdot\overline{C}+\overline{A}\cdot B\cdot\overline{C}+\overline{A}\cdot\overline{B}\cdot C+A\cdot B\cdot C$$

Carry $$C_F=C_H+C_{H_1}$$

$$C_F=A\cdot B+S_H\cdot C$$

$$C_F=A\cdot B+(A\cdot\overline{B}+\overline{A}\cdot B)C$$

$$C_F=A\cdot B+A\cdot\overline{B}\cdot C+\overline{A}\cdot B\cdot C$$

Let $R-A\cdot\overline{B}\cdot C+\overline{A}\cdot B\cdot C$

Then $$C_F=A\cdot B+R$$

$$C_F=A\cdot B\cdot C+A\cdot B\cdot\overline{C}+R$$

$$C_F=A\cdot B\cdot C+A\cdot B\cdot\overline{C}+A\cdot\overline{B}\cdot C+\overline{A}\cdot B\cdot C$$

From the above, it is clear that a binary 1 output signal exists at sum output $S_F$ only when any one or all three of the inputs A, B, C are in the binary 1 state and that a binary 1 carry signal is generated at carry output $C_F$ only when two or all three inputs A, B, C are in the binary 1 state.

FIGURE 3 illustrates in a shorthand way, a slight modification which can be made in the system when the binary signals of the inputs A, B are relatively weak or when for some other reason it is difficult to discriminate between the binary 1 and 0 signals. In FIGURE 3, "active" OR elements or monostable devices with power and dump means P+, P−, respectively, are added to the system at critical points to boost the binary 1 signals and to positively decouple the half adder elements 2 and 3 from each other. More particularly, OR gate 50 amplifies the binary 1 signal of the intermediate sum output $S_H$, OR gate 60 amplifies the binary 1 signal of the final sum S and OR gate 70 amplifies the binary 1 signal of the carry output $C_F$. Further, the binary 1 output signals of the half adders 2, 3 now communicate with each other only through the power stream of the monostable devices whereby each is generally unaffected by the load conditions from the other. This feature thus tends to eliminate spurious and false signals caused by backloading from the other elements in an adder system of the type described, although it is to be understood that this additional means is generally not needed when employing my novel multi-component half adder, as explained above.

Figure 4:
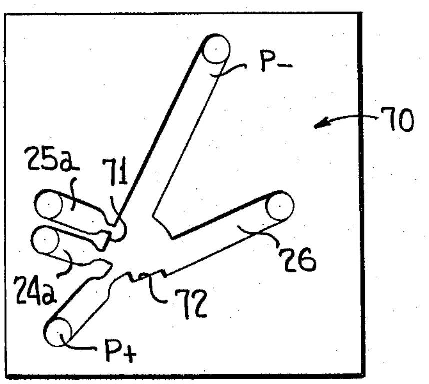
FIGURE 4 is a schematic illustration of one portion of the system of FIGURE 3 that is modified.

The OR gates 50, 60 and 70 are or may be of a known type as described in my co-pending case entitled "Pressure Band Detector," Serial No. 370,160, filed May 26, 1964. In FIGURE 4 of the present drawings, the OR gate 70 has been illustrated and includes the input ducts 24*a*, 25*a* and the output passageway 26, both as numbered in the OR element 4 of FIGURE 1, power means P+ and dump P−. In short, when binary 0 signals are present at both 24*a* and 25*a*, the power stream from the power means P+ locks onto sidewall 71 by boundary layer effects which cause a low pressure region adjacent said wall in accordance with well known principles. The OR gate 70 is designed so that a binary 1 signal at either 24*a* or 25*a* will disperse the boundary layer along sidewall 71 to thereby force the power stream to enter the output passageway 26 thereby affording a binary 1 output signal. As soon as the binary 1 signal is removed at the input ducts 24*a*, 25*a*, the stream flips back to the dump P− since sidewall 72 is constructed to prevent boundary layer lock-on, as shown. It is to be understood that the OR gates 50 and 60 are constructed in a similar fashion except that a single input duct is employed.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A fluid logic system comprising two half adder elements and an OR element for performing a binary addition function on input signals from input passages A, B and C so that $$\text{Sum}=A\cdot\bar{B}\cdot\bar{C}+\bar{A}\cdot B\cdot\bar{C}+\bar{A}\cdot\bar{B}\cdot C+A\cdot B\cdot C$$
$$\text{Carry}=A\cdot B\cdot C+A\cdot\bar{B}\cdot C+\bar{A}\cdot B\cdot C+A\cdot B\cdot\bar{C}$$

each of said half adders comprising an exclusive OR component for generation of binary 1 and 0 sum output signals and a separate and distinct AND component for generation of binary 1 and 0 carry output signals, each of said components comprising output duct means positioned to receive fluid flow during generation of said binary 1 output signals and dump means positioned to receive fluid flow during generation of said binary 0 output signals and to relieve said system of excess fluid during operation, said output duct means of said exclusive OR components and said dump means of said AND components being substantially axially aligned with and directed toward said input passages.

2. The combination according to claim 1, wherein power means of the monostable type are provided downstream of each of said exclusive OR components to amplify said binary 1 sum signals.

3. The combination according to claim 2, wherein said OR element comprises power means of the monostable type to amplify said binary 1 carry signals.

4. A fluid logic element adapted for use in fluid systems and the like for performing the binary half adder function on input signals from input passages A, B so that $$\text{Sum}=A\cdot\bar{B}+\bar{A}\cdot B$$
$$\text{Carry}=A\cdot B$$

comprising an exclusive OR component for generation of binary 1 and 0 sum output signals and a separate and distinct AND component for generation of binary 1 and 0 carry output signals, each of said components comprising output duct means positioned to receive fluid flow during generation of said binary 1 output signals and dump means positioned to receive fluid flow during generation of said binary 0 output signals and to relieve said system of excess fluid during operation, said output duct means of said exclusive OR components and said dump means of said AND components being substantially axially aligned with and directed toward said input passages.

5. A fluid binary half-adder comprising first and second substantially identical passive fluid elements each including first and second input passages having intersecting axes, first and second outlet passages each axially aligned with a different one of said input passages, a third outlet passage having its axis lying essentially at equal angles to said first and second input passages, a sum outlet channel connected to said third outlet passage of said first passive fluid element, an exclusive "OR" outlet channel connected to said first and second outlet passages of said second passive fluid element, said first input channels connected to receive a first input signal and said second input channels connected to receive a second input signal.

References Cited by the Examiner

UNITED STATES PATENTS

| | | | |
|---|---|---|---|
| 3,107,850 | 10/1963 | Warren et al. | 235—201 |
| 3,128,040 | 4/1964 | Norwood | 235—201 |

OTHER REFERENCES

Mitchell, "Fluid Binary Full Adder," IBM Technical Disclosure Bulletin, vol. 5, No. 6, November 1962, page 26.

Mitchell et al., "Fluid Logic Devices and Circuits," Transactions of the Society of Instrument Technology, Feb. 26, 1963, pp. 1–14.

Glattli, "Fluid Binary Full-Adder," IBM Technical Disclosure Bulletin, vol. 6, No. 2, July 1963, page 29.

Richards, Arithmetic Operations in Digital Computers, Princeton, N.J., D. Van Nostrand Co., 1955, pages 83–92.

RICHARD B. WILKINSON, *Primary Examiner.*

LOUIS J. CAPOZI, *Examiner.*

W. F. BAUER, *Assistant Examiner.*